(12) United States Patent
Stibich et al.

(10) Patent No.: US 6,488,471 B1
(45) Date of Patent: Dec. 3, 2002

(54) GAS-TURBINE BRUSH SEALS WITH PERMANENT RADIAL GAP

(75) Inventors: Marvin A. Stibich, Huber Heights, OH (US); Gregory S. Bloch, Beavercreek, OH (US); Steven L. Puterbaugh, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/844,742

(22) Filed: Apr. 27, 2001

Related U.S. Application Data

(60) Provisional application No. 60/237,494, filed on Oct. 4, 2000.

(51) Int. Cl.[7] .................................................. F01D 11/14
(52) U.S. Cl. ........................ 415/173.3; 415/231; 60/779
(58) Field of Search ............................ 415/173.3, 174.2, 415/174.5, 173.5, 231; 60/805, 779

(56) References Cited

U.S. PATENT DOCUMENTS

| | | |
|---|---|---|
| 885,032 A | 4/1908 | Ferranti |
| 3,916,054 A | 10/1975 | Long et al. |
| 3,917,150 A | 11/1975 | Ferguson et al. |
| RE30,206 E * | 2/1980 | Ferguson .................... 415/174 |
| 4,526,509 A | 7/1985 | Gay, Jr. et al. |
| 5,628,622 A | 5/1997 | Thore et al. |
| 5,752,802 A | 5/1998 | Jones |
| 6,139,019 A * | 10/2000 | Dinc .......................... 277/355 |

* cited by examiner

*Primary Examiner*—Ehud Gartenberg
(74) *Attorney, Agent, or Firm*—Richard A. Lambert; Bobby D. Scearce; Thomas L. Kundert

(57) ABSTRACT

Certain transient events such as hard landings, high g-rate turns, thermal conditions, and high turbulence may cause rubbing events inside the gas turbine that result from the flexure of the engine shafts. In order to prevent permanent damage to the engine or operational interference, brush seals are used such that the tips of the stator blades and the tips of the respective opposing annular brush seals, and the tips of the rotor blades and the tips of the respective opposing annular brush seals define substantial radial clearances that provide gaps that remain open under all regular and normal operating conditions of the gas engine.

1 Claim, 5 Drawing Sheets

GAS-TURBINE BRUSH SEALS WITH PERMANENT RADIAL GAP

The present application is related to and claims priority on prior copending provisional Application No. 60/237,494, filed Oct. 4, 2000, entitled Compliant Compressor Casing for Turbine Engines.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to gas turbine engines and, more specifically, to a gas turbine engine having a compliant casing.

The efficiency of gas turbine engines depends in part on the dimensional clearances between the inner components. Generally, it is important that the gap between the rotor tip and casing be made as small as practical. As the gap clearance increases, tip clearance vortices increase, resulting in the reduction of mass flow, pressure ratio, efficiency and stall margin.

While the design tip clearance described above is desirably kept to a minimum, there is a practical lower bound to the minimum dimension available to the designer. Specifically, certain transient events, for example, hard landings, high g-rate turns, thermal conditions, or even high turbulence can cause the shafts of the engine to flex, dramatically decreasing the tip clearance. If the design tip clearance were too small, these transient events could cause the rotor to physically strike a portion of the casing. If this occurs, both the casing and the rotor will be damaged and the clearance between the rotor tip and casing will be permanently increased. This increased clearance will result in a permanent decrease in aerodynamic performance of the gas turbine engine until the damaged components can be removed and repaired or replaced.

As can be seen, a design trade-off exists between maximizing engine performance through the minimization of component clearances versus increasing the clearances to accommodate expected transient conditions. For example, if the tip clearance is made larger, the performance of a new engine will not be as good, but the engine will be less likely to suffer a permanent decrease in performance caused by a casing rub event. It should be appreciated that this design trade-off owes its existence in no small part to the conventional gas turbine engine designs in common use today. Specifically, the inner surface of conventional casings is made of solid material, either a single metal or some type of composite. While this material is adequate for maintaining design clearances, it is also very unforgiving and inevitably sustains permanent damage when casing rub events occur.

A need exists therefore for a gas turbine engine having minimum clearances for optimizing performance, yet is capable of sustaining expected transient operating conditions including casing rub events without suffering damage.

SUMMARY OF THE INVENTION

It is therefore a primary object of the present invention to provide a gas turbine engine having a compliant casing to enable use of minimum component clearances yet accommodate casing rub events, sustaining no permanent engine damage.

It is another object of the invention to provide a gas turbine engine having a rub tolerant compliant casing including brush seals to accommodate transient rub events.

It is still another object of the present invention to provide a gas turbine engine having a compliant casing including a plurality of sets of brush seals placed in the areas between the compressor rotor tips and the stationary compressor casing.

It is still another object of the present invention to provide a gas turbine engine having a compliant casing including a plurality of sets of brush seals placed in the areas between the compressor stator tips and the rotating compressor hub.

Additional objects, advantages and other novel features of the invention will be set forth, in part, in the description that follows and will, in part, become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects and in accordance with the purposes of the present invention as described herein, a gas turbine engine having a compliant casing is described. The compliant casing enables the utilization of minimum clearances for optimizing engine efficiency while providing a deformable, resilient surface for accommodating casing rub events, sustaining no physical damage.

The preferred embodiment of the turbine engine having a compliant casing selected to illustrate the teachings of the present invention includes a number of brush seals received within the spaces between the rotor blade tips and the stationary casing and between the stationary blade tips and the rotating hub. The best mode of practicing the invention also contemplates the placement of brush seals between the rotor blade tips and the stationary casing, or, alternatively, between the stationary blade tips and the rotating hub. The brush seals provide the twofold advantages of enabling the turbine engine to utilize minimum clearances between components while being deformable to sustain rub events.

Conventional gas turbine engine technology teaches the use of solid inner casing surfaces. These solid surfaces are made of either a single metal or some type of composite. While this choice of material is adequate for maintaining design clearances, these surfaces are very unforgiving and inevitably sustain permanent damage when casing rub events occur. This has the undesirable result of permanently reducing engine efficiency until the engine can be removed and the damaged parts replaced.

Advantageously, the annular brush seals are incorporated within either or both the rotor and stator passages in order to optimize engine efficiency. The provision of brush seals in the areas between rotating and stationary components in the compressor section provides for a deformable surface capable of tolerating rub events while serving to minimize machine clearances, enhancing engine efficiency throughout the range of expected operating conditions.

Advantageously, therefore, the undesirable effects of casing rub events can be avoided by the teachings of the present invention as well as optimizing turbine engine efficiency.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 4:
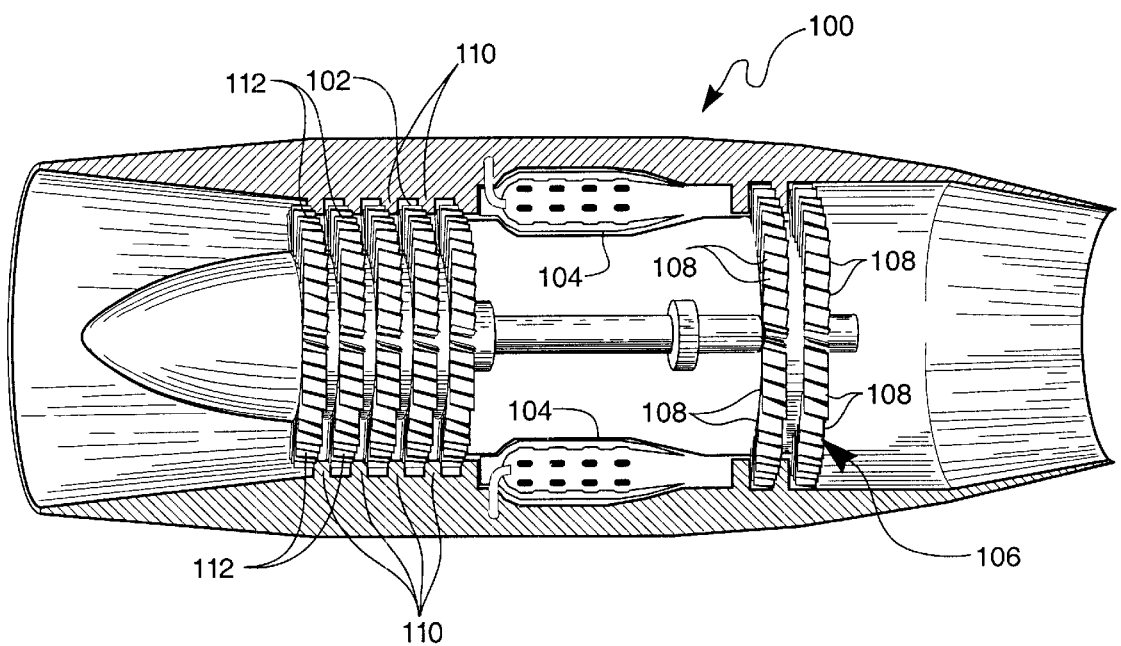
FIG. 4 is a cross sectional view of a representative gas turbine engine.

Reference is made to the drawing figures showing the gas turbine engine having a compliant casing of the present invention. As is known in the art, in a typical gas turbine engine 100 as shown in FIG. 4, a compressor section 102 receives atmospheric air and pressurizes it prior to admission into the combustion chambers 104 wherein it is ignited and further directed into the turbine section 106. The turbine section 106, powered by the expansion of the combustion gasses acting upon the turbine rotor blades 108, provides the desired thrust as well as the motive force for the compressor section 102. The compressor section 102 includes a series of compressor stages, each of which is comprised of a rotor blade row 112 that is proximate an associated stator blade row 110. The number of stages of stator blades 110 and associated rotor blades 112 varies according to a particular gas turbine engine design.

Figure 1:
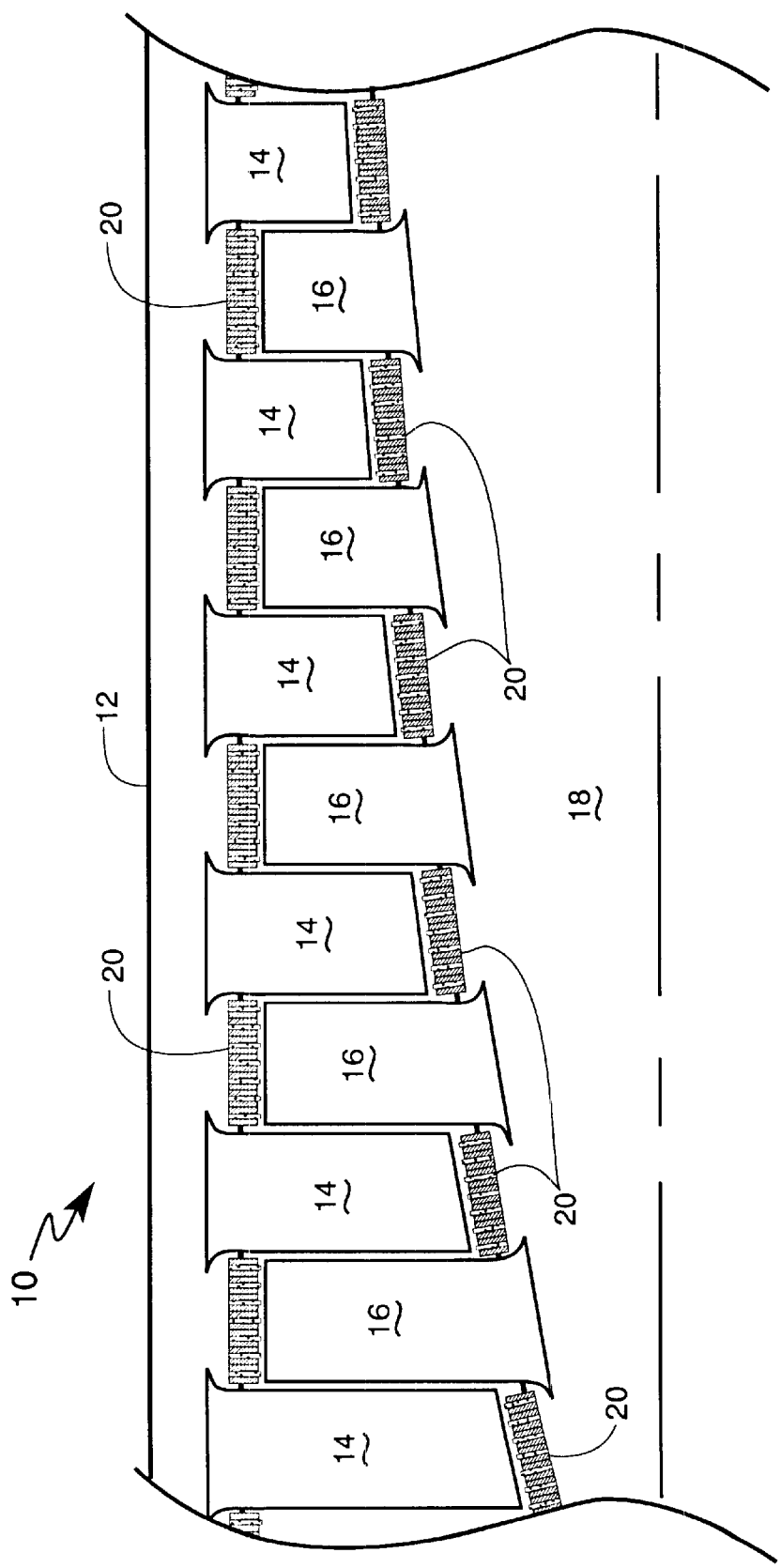
FIG. 1 is a diagrammatic cross sectional view of portion of the compressor of the gas turbine engine having a compliant casing of the present invention.

Reference is made to FIG. 1 showing the gas turbine engine having a compliant casing 10 of the present invention. As is known in the art, the turbine engine includes a compressor casing 12 including a plurality of stages of stator blades 14 arranged radially. Each row of stator blades 14 has a corresponding row of rotor blades 16 mounted upon a rotor 18. The rotor 18 is rotatably retained within the gas turbine engine by one or more sets of bearings, not shown.

Figure 3:
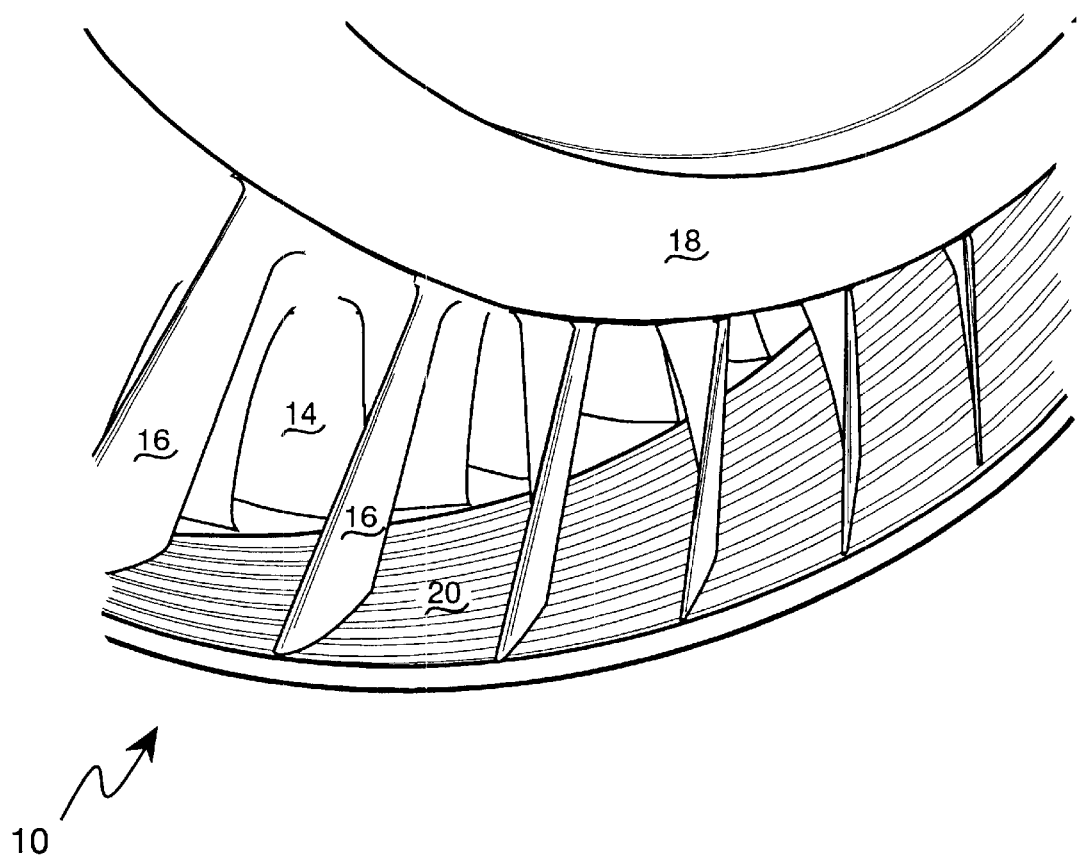
FIG. 3 is a partial perspective view of the gas turbine engine having a compliant casing of the present invention.

According to an important aspect of the present invention, the casing 12 is made compliant by the incorporation of a plurality of annular brush seals 20. As shown, the brush seals are mounted on the casing 12 in the axial gap between the rows of stator blades 14; the brush seals in this position are located radially outward from the tips of the rotor blades 16. The brush seals 20 are also shown mounted on the rotor 18 in the axial gap between the rows of rotor blades 16; the brush seals in this position are located radially inward from the hub of the stator blades 14. See also FIG. 3 wherein a stage of brush seals 20 are shown adjacent the inlet of the compressor.

Figure 2:
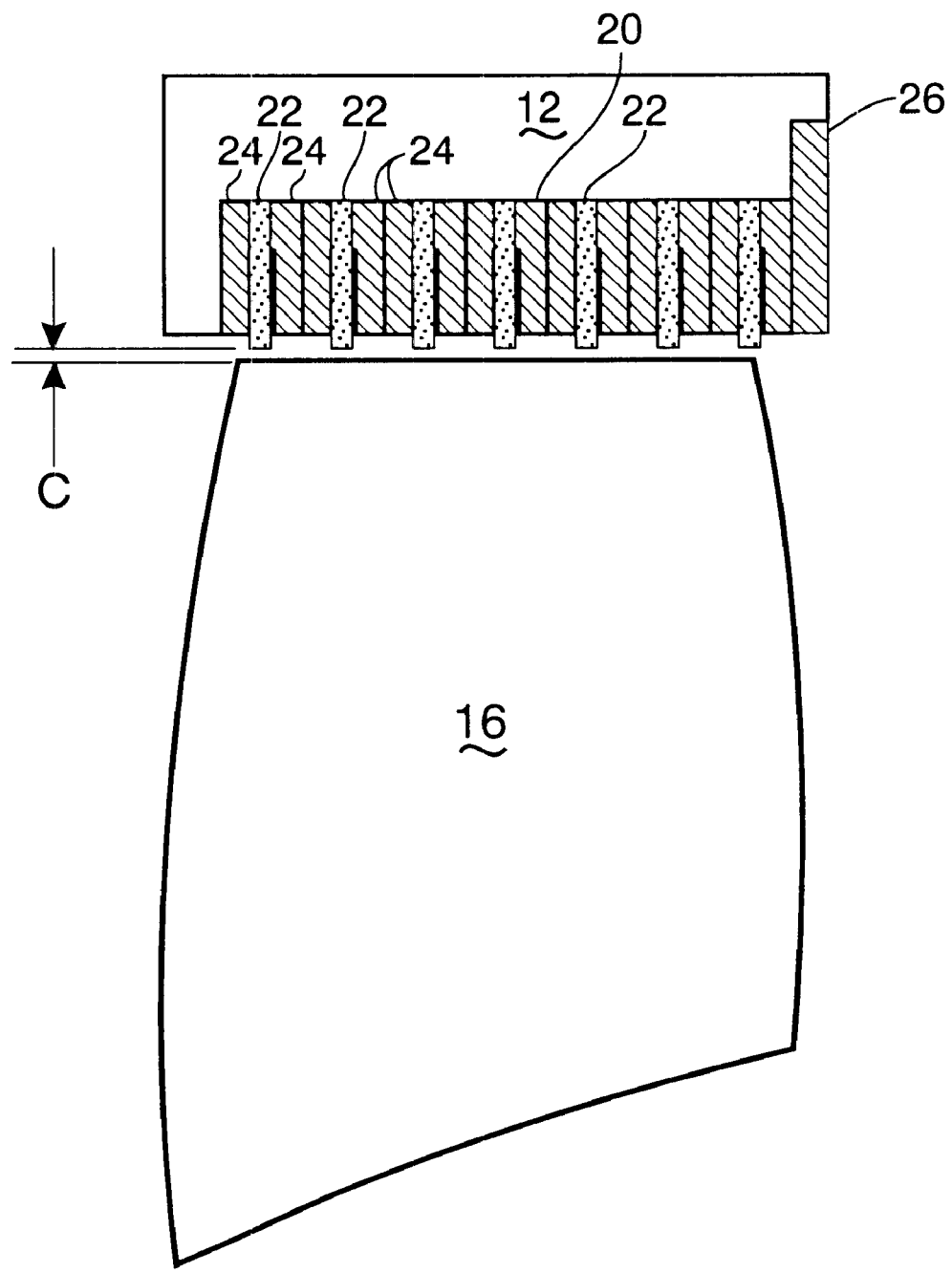
FIG. 2 is a partial cutaway view showing a rotor blade adjacent a brush seal of the gas turbine engine having a compliant casing of the present invention.
Figure 5:
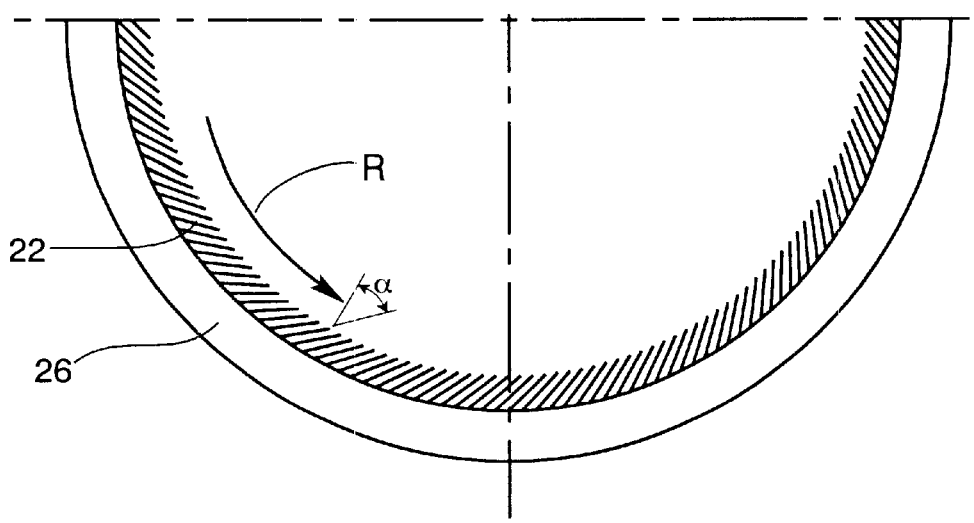
FIG. 5 is an axial view of a portion of a brush seal of the gas turbine engine having a compliant casing of the present invention.

As shown in FIG. 2, a rotor blade 16 is shown in proximity to the corresponding brush seal 20. Brush seals are known in the art. Generally, brush seals include a plurality of closely packed bristles held in place by a backing plate or some other means. In the present application, the brush seals 20 would have an annular configuration to conform to the rotor and stator outer and inner surfaces respectively. The method of attachment can be welding, clamping or the like. In the preferred embodiment, a series of bristle packs 22 are retained between backing plates 24. The bristles are preferably oriented at a 45° angle with respect to the to angle of rotation R of the rotor as shown in FIG. 5. The bristles comprising the bristle packs 22 can be fabricated from many materials, metal being used most often. An end plate 26 is provided in order to retain the entire brush seal 20 together as an assembly. The invention is not considered limited to this specific configuration of brush seal, however.

As shown, the brush seal 20 has an axial length substantially equal to the axial length of the corresponding rotor blade 16. It should be understood that brush seals 20 having a shorter axial length could be incorporated as well. In this alternative, the brush seals 20 would cover only the portion of the axial length from the forward end of the corresponding rotor blade to the point of departure of the passage shock. This would enable the same desirable aerodynamic and aeromechanic benefits while reducing weight and cost.

As also shown in FIG. 2, a minimum clearance C is maintained between the brush seal 20 and the rotor blade. The clearance C dimension is determined according to standard turbine engine design principles and can be varied in order to suit a given application. The compliant nature of the brush seals 20 provides the twofold benefits of enabling minimum machine clearances to enhance engine efficiency while providing a deformable seal for temporarily deforming and then springing back when the rub event has terminated, advantageously avoiding permanent engine damage. The advantages provided by the gas turbine engine having a compliant casing of the present invention are thus profound.

In summary, numerous benefits have been described from utilizing the principles of the present invention. The gas turbine engine having a compliant casing of the present invention includes a compliant casing including brush seals radially disposed between rotating rotor blade rows and the stationary outer casing, and radially disposed between stationary stator blade rows and the rotating hub. These brush seals enable the engine to withstand transient casing rub events with no permanent damage and enable turbine operation with minimum component tip clearances, maximizing efficiency.

The foregoing description of the preferred embodiment has been presented for purposes of illustration and description. It is not intended to be exhaustive or to limit the invention to the precise form disclosed. Obvious modifications or variations are possible in light of the above teachings. For example, other configurations of brush seals may be satisfactorily implemented. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. A method of enabling a gas turbine engine compressor to withstand transient rub events, said compressor including an axially disposed, rotatable rotor having a series of rotor blades arranged axially in rows received within a stator including a series of stator blades arranged axially in rows corresponding with said rows of rotor blades, said method comprising the steps of:

providing rub tolerant, deformable surfaces in between each of said rows of stator blades and located radially outward from the tips of the corresponding row of rotor blades;

providing rub tolerant, deformable surfaces upon the surface of said rotor in between each of said rows of rotor blades spaced a distance radially from the tips of the corresponding row of stator blades;

said rub tolerant, deformable surfaces in said first providing step above having an axial length substantially equal to the axial length of said corresponding row of rotor blades;

said rub tolerant, deformable surfaces in said second providing step above having an axial length substantially equal to the axial length of said corresponding row of stator blades; and, said rub tolerant, deformable surfaces from said providing steps above being annular brush seals; wherein the tips of the stator blades and the tips of the respective opposing annular brush seals, and the tips of the rotor blades and the tips of the respective opposing annular brush seals define substantial radial clearances that provide gaps that remain open under all regular and normal operating conditions of the gas engine.

* * * * *